United States Patent
Morrow et al.

(10) Patent No.: US 6,405,275 B1
(45) Date of Patent: Jun. 11, 2002

(54) IEEE1394 COMMON ISOCHRONOUS PACKET (CIP) ENHANCEMENTS FOR HOST CONTROLLERS

(75) Inventors: Neil G. Morrow, McKinney; Danny L. Mitchell, Lake Dallas, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/333,788

(22) Filed: Jun. 15, 1999

Related U.S. Application Data

(60) Provisional application No. 60/089,314, filed on Jun. 15, 1998.

(51) Int. Cl.$^7$ .............................................. G06F 13/00
(52) U.S. Cl. ..................... 710/305; 710/104; 710/105; 710/300; 370/487
(58) Field of Search ................... 710/105, 300, 710/104, 305; 370/487

(56) References Cited

U.S. PATENT DOCUMENTS

| | | | | | |
|---|---|---|---|---|---|
| 5,933,430 A | * | 8/1999 | Osakabe et al. | ............ | 370/395 |
| 6,115,770 A | * | 9/2000 | Gehman | ..................... | 710/128 |
| 6,172,989 B1 | * | 1/2001 | Yanagihara et al. | ........ | 370/473 |
| 6,233,637 B1 | * | 5/2001 | Smyers et al. | .............. | 710/129 |
| 6,266,727 B1 | * | 7/2001 | Smyers et al. | .............. | 710/105 |
| 6,304,553 B1 | * | 10/2001 | Gehman et al. | ............ | 370/235 |
| 2001/0019561 A1 | * | 9/2001 | Staats | ........................ | 370/487 |

\* cited by examiner

*Primary Examiner*—Rupal Dharia
(74) *Attorney, Agent, or Firm*—Alan K. Stewart; Wade James Brady, III; Frederick J. Telecky, Jr.

(57) ABSTRACT

The disclosed invention utilizes a host controller's mechanism to start an isochronous transmit stream on a particular IEEE1394 bus cycle to calculate an offset value from the first time stamped packet that is transmitted in a CIP stream. Packet generating applications indicate the desired offset through the difference of programmed time to start transmitting and the value placed in the first time stamp field. This offset is then applied to the time stamps that are inserted in the remainder of the packets.

2 Claims, 1 Drawing Sheet

IEEE1394 COMMON ISOCHRONOUS PACKET (CIP) ENHANCEMENTS FOR HOST CONTROLLERS

This application claims priority from Provisional application Ser. No. 60/089,314, filed Jun. 15, 1998.

BACKGROUND OF THE INVENTION

The IEEE (Institute of Electrical and Electronics Engineers) Computer Society published the IEEE STD 1394-1995 entitled, "IEEE Standard for a High Performance Serial Bus." This standard and its follow-on supplements define a serial data bus with a cable and backplane environment, non-cyclic topology, scalable data rates starting at 100 Megabits per second, and the cable arbitration system uses a self-configuring hierarchical request/grant protocol that supports hot plugging and widely varying physical topologies.

In addition to standard read/write and lock transactions, the high performance serial bus defined in IEEE STD 1394-1995 (hereinafter referred to as the IEEE1394 bus) provides extensive time-based services. These services include isochronous data transport (guaranteed latency and bandwidth) and an accurate sub-microsecond global timebase for synchronizing events and data. It is the isochronous service provided by the IEEE1394 bus that make it an attractive interconnect between consumer audio/video equipment.

The International Electrotechnical Commission (IEC) International Standard IEC 61883-1 entitled "Digital Interface For Consumer Audio/Video Equipment" defines the general packet format, data flow management, and connection management for audio/visual data, and also the general transmission rules for control commands. Transmission of Digital Video Cassette Recording (DVCR) system data, MPEG2 transport streams, and audio and music data transmission are among the data flows that fall into the scope of the above-mentioned IEC standard. These data transmissions utilize the isochronous service provided by the IEEE1394 bus.

The packet format defined by IEC 61883-1 for isochronous data transmissions is referred to as common isochronous packet (CIP) format. The CIP format utilizes the isochronous packet format defined by IEEE1394, has allocated a particular tag value, and includes a header (hereinafter referred to as a CIP header) placed at the beginning of the data field of an IEEE1394 isochronous packet, immediately followed by zero or more data blocks. The CIP header contains fields that specify stream dependent variables such as a format identifier, data block size, an indication of a time stamp, and a format dependent time stamp field.

The time stamp in a common isochronous packet is used for application dependent synchronization needs, such as video frame synchronization in DVCR streams. Typically, this time stamp indicates to a receiver when to release the packet to its real-time application, which in some cases has strong requirements on the timing and jitter of the deliver of individual packets or blocks of packets. Smoothing buffers often meet these requirements by holding received data until the IEEE1394 bus time matches the time stamp value, and there are typically rules associated with late packets. Hence, the time stamp value should be greater than or equal to the expected packet arrival time at the receiver, and the offset placed in the time stamp at transmission is attained from a worst case transmission delay calculation.

Various real-time applications that transmit CIP streams (those that comply with IEC 61883-1) have little problems with the inclusion of time stamps. These transmitters may construct and insert CIP headers and format the data per IEC 61883-1, and have knowledge of IEEE1394 bus time during this construction. A hard coded or programmable offset is added to the IEEE1394 bus time to construct the time stamp to account for deliver delay.

CIP streams may be transmitted to the IEEE1394 bus from a personal computer (PC) system, possibly from a DVCR editing application. In this environment there typically exists what is referred to as an IEEE1394 host controller that connects a PC host bus to a PHY/Link or cable interface defined by IEEE1394. Software executing on the PC host system generates the CIP streams and queues the packets through the operating system to be transmitted by the host controller. Software executing on platforms with typical host controllers must keep track of IEEE1394 bus time to insert time stamps, and the bus time is typically ascertained by reading a host controller register.

Unfortunately, there are several problems that present themselves when software attempts to insert time stamps in CIP headers. One such problem is due to the fact that IEEE1394 bus time can change due to a bus reset event, and a race condition thus exists between the last read of bus time and the time a packet or packets are queued to the host controller for transmission. The potentially bogus time stamp may not be catastrophic, but may yield a lower quality experience. For example, a dropped frame or two of video may not dramatically affect the end user's experience, but a dropped frame or two of music data could yield an audible and undesirable result.

Since reading the IEEE1394 bus time several times a second (up to 30 for full motion video) can become a performance burden, software that generates CIP streams may attempt to interpolate the time stamp field. In this case a transient software latency condition that causes one frame to be delivered late may affect the entire stream catastrophically.

Although some CIP stream receivers do not have strong requirements on the timing and jitter of CIP packet delivery, there are formats that currently do have these requirements, and it is expected that formats will be created that will exhibit these requirements. CIP streams generated via software using operating systems that are not real-time in nature may have performance problems due to unexpected or undesirable operating system latencies.

A strong desire exists to solve the foregoing problems associated with CIP stream transmission from platforms that implement a host controller and operating system that is not real-time in nature.

SUMMARY OF THE INVENTION

In accordance with the present invention, there is disclosed an IEEE1394 host controller which connects a computer to the IEEE1394 bus via an input/output data bus, the IEEE1394 bus automatically inserting time stamp information, based upon the host controller concept of IEEE1394 bus time, into isochronous packets.

Further in accordance with the present invention, there is disclosed a method of calculating an offset to add to IEEE1394 bus time when automatically inserting time stamp information into isochronous packets. The method utilizes the host controller functionality to start an isochronous transmit stream at a value of IEEE1394 bus time, the offset being the difference between the transmit stream start time and the first time stamp present in the data stream.

The CIP header enhancements for host controllers described here can remove the factor of IEEE1394 bus time from the algorithm that generates the isochronous stream CIP headers. This invention can prevent unexpected software latencies in the operating system from providing incorrect time stamps, which can result in catastrophic performance to the end user.

This invention can remove the additional host bus bandwidth and packet creation overhead required in reading IEEE1394 bus time from the host controller before queuing packets for transmission through the operating system. The race condition that exists between the last read of IEEE1394 bus time from the host controller and the actual time (bus time can change) the packet is transmitted can be removed with this invention.

BRIEF DESCRIPTION OF THE DRAWINGS

The foregoing features of the present invention may be understood more fully from the following detailed description, read in conjunction with the accompanying drawings, wherein.

DESCRIPTION OF THE PREFERRED EMBODIMENTS

In accordance with the present invention, there is described herein an IEEE1394 host controller that automatically inserts time stamps in the CIP header SYT field defined by IEC61883-1, or other format dependent synchronization fields. This invention is not limited to the insertion of time stamps for either any particular stream format or any particular placement of such a time stamp field. Host controllers that implement this invention are not limited to any particular programming interface, and the model defined by the IEEE1394 Open Host Controller Interface (OHCI) Specification was used for an illustrative implementation.

Figure 1:
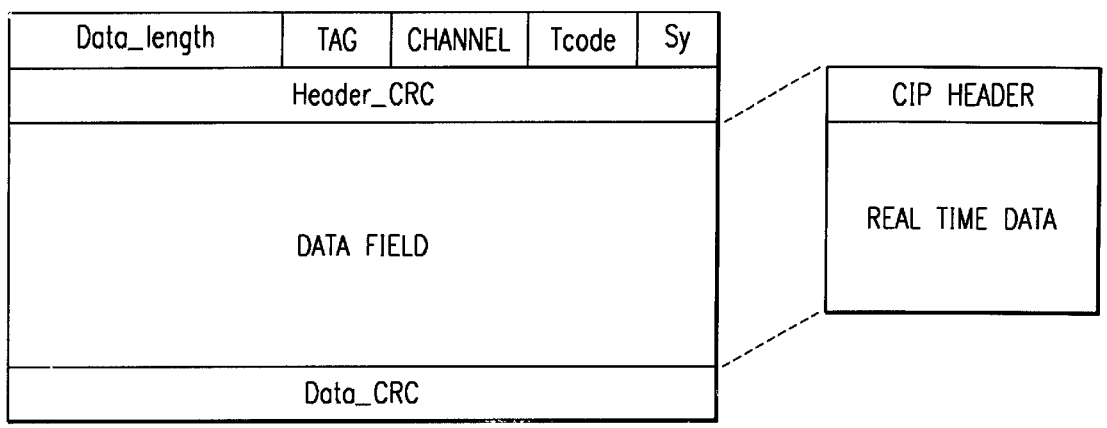
FIG. 1 illustrates the isochronous packet format defined by IEEE1394, further including the CIP header and real-time data of a common isochronous packet as an insert to the data field of an IEEE1394 isochronous packet.
Figure 2:
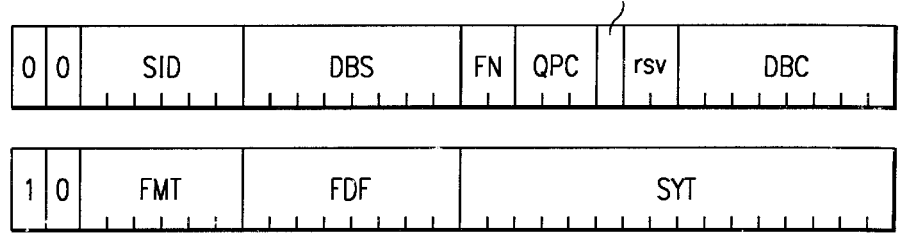
FIG. 2 illustrates a two quadlet CIP header with an SYT field per IEC61883-1 for use in the packet format of FIG. 1.

The structure of a two quadlet CIP header with the SYT field is shown in FIG. 2, and the placement of the CIP headers in an isochronous data packet is shown in FIG. 1. FIG. 1 illustrates the isochronous packet format defined by IEEE1394, and the CIP header and real-time data of a common isochronous packet as an insert to the data field of an IEEE1394 isochronous packet. Referring to FIG. 1, the following fields are defined by IEEE1394:

Sy—(sync) Field used for stream dependent synchronization.

Tcode—Value of 10 for isochronous packets

Channel—Specifies which of 63 slots the stream is transmitted

Tag—For IEC61883-1 streams, this field as a value of 1

Data_Length—Specifies the length of the data field

Header_CRC—Checksum over the first quadlet

Data Field—Data payload, and may include a CIP header

Data_CRC—Checksum over the data field.

FIG. 2 illustrates a two quadlet CIP header with an SYT field per IEC61883-1 (bit 30–Form_0, Form_1=0). The following fields are defined by IEC61883-1:

DBC—Data block count used to detect a loss of data blocks

SPH—Indicates that the source packet has a source packet header, and may indicate when SYT has a valid time stamp QPC—Quadlet padding count for equally sized data blocks FN—Indicates the number of data blocks per source packet.

DBS—Data block size

SID—Source node ID (IEEE1394 node ID of the transmitter)

SYT—Time stamp field present depending on format. SYT encodes the lower 16 bits of the IEEE1394 CYCLE_TIME register (IEEE1394 bus time)

FDF—Format dependent field

FMT—Format identifier indicates type of stream

The CIP header format is defined by IEC61883-1, and the SYT field corresponds to the lower 16-bits of the IEEE1394 CYCLE_TIME register. The initial implementation of this invention inserts a calculated time stamp value in the SYT field under certain conditions.

A host controller that implements this invention introduces hardware enhancements in the isochronous transmit function. To determine that a time stamp field exists, a host controller may determine that the stream is compliant with IEC61883-1 by the indication of such compliance through a two bit tag (FIG. 1) value of 1 in the isochronous packet header. The host controller may determine where and if a time stamp exists in a data stream by examining the FMT field and other CIP header fields (FIG. 2) that describe the stream content and stream format. The invention described here is not limited to any particular stream format detection mechanism in the host controller. For example, hardware registers may be added to the host controller to select isochronous transmit streams that demand time stamp insertion.

The initial implementation of this invention inserts time stamps into the SYT field of the CIP header for streams that meet either the DVCR or audio/music data transmission formats. These formats are respectively specified by IEC61883-1 and an IEEE1394 Trade Association document entitled "Audio and Music Data Transmission Protocol." The DVCR format requires a value of zero in the six bit FMT field in the CIP header, and the audio/music format requires a value of 16 (represented as 0×10 in hexadecimal). The invention described here is not limited to DVCR and audio/music formats, and may be utilized to insert time stamps and synchronization data into the isochronous packet data field for streams of formats such as MPEG2 or those formats yet to be defined.

Typically, the SYT field in a common isochronous packet will contain an offset from the IEEE1394 bus time (CYCLE_TIME) when the packet is transmitted on the IEEE1394 bus. This offset is used to account for delivery jitter due to IEEE1394 bus arbitration and allows receivers to deliver packets to applications with separations independent of the IEEE1394 bus isochronous period. Some implementations will insert time stamps in packet data at layers above the data link layer defined by IEEE1394, and offsets in time stamps for such packets may account for delay through the link layer. An offset of value equivalent to 2 or 3 IEEE1394 bus isochronous periods is typically implemented to allow for relatively small buffering at the receiver.

Typically a host controller implements a mechanism to start an isochronous transmit stream on a particular IEEE1394 bus cycle. The initial implementation of this invention utilizes this function to calculate an offset value from the first time stamped packet that is transmitted in a CIP stream. Packet generating applications indicate the desired offset through the difference of programmed time to start transmitting and the value placed in the first time stamp field. This offset is then applied to the time stamps that are inserted in the remainder of the packets. The invention described here is not limited to any particular offset calculation mechanism, and can be useful in applications where offsets are not applied to time stamps.

A description of the time stamp insertion procedure as may be illustratively implemented in accordance with the present invention follows. It is assumed that there exists a four bit register, SYT_OFFSET[3:0], per isochronous transmit DMA context. It is further assumed that there exist two flags to indicate the transmission of DVCR streams and AUDIO/VIDEO streams. These flags are DV and AV, and they default to a FALSE state. The procedure includes the following steps:

1. Check that the time stamp feature is enabled for the host controller. The time stamp features are independently enabled per supported format.
2. If tag==1 and FMT==0, then DV=TRUE; if tag==1 and FMT==16, then AV=TRUE.
3. Store SYT_OFFSET[3:0] when the first packet is transmitted after the isochronous transmit DMA first becomes enabled for operation. SYT_OFFSET[3:0]= SYT[15:12]−CYCLE_TIME[15:12].
4. For each packet in the stream, if ((SPH==1 and DV) or AV) then SYT[15:12]=CYCLE_TIME[15:12]+SYT_OFFSET[3:0].
5. Disabling the isochronous transmit DMA sets DV=AV= FALSE.

Figure 3:
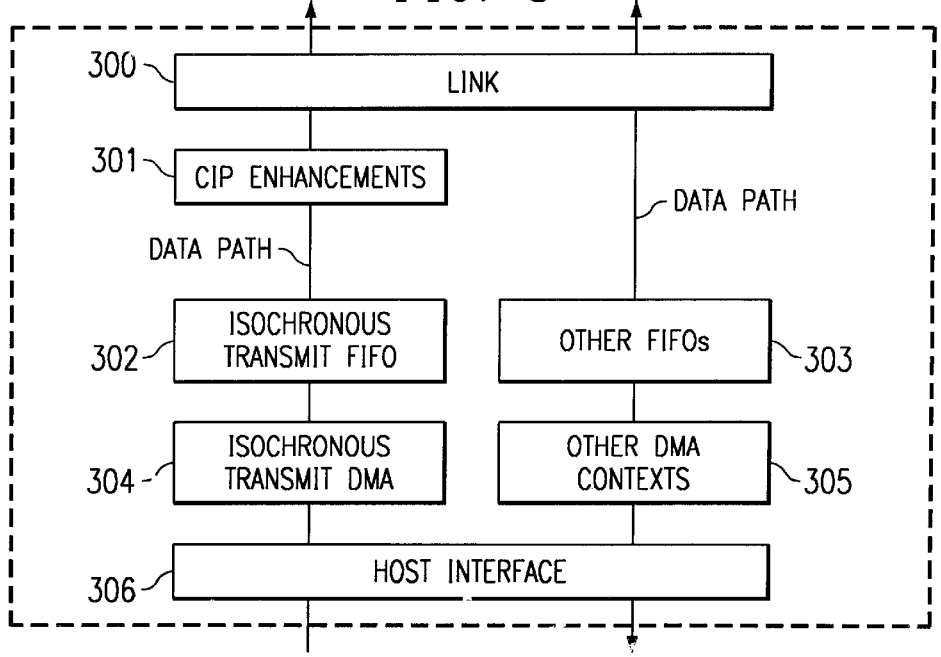
FIG. 3 illustrates a block diagram of an IEEE1394 host controller.

FIG. 3 illustrates a block diagram of an IEEE1394 host controller implementing the blocks to perform such a procedure. The area enclosed in the dashed box 44 represents the host controller logic, which is conceptually broken into several blocks. The blocks are described in the following paragraphs.

Link 30 is responsible for interfacing to the IEEE1394 cable or backplane environment, and may connect to a PHY/Link interface, or an embedded internal interface to the IEEE1394 physical layer.

CIP Enhancements 32 represents one logical placement of the invention described herein. Data is examined as it is pulled from the isochronous transmit (IT) FIFO, and time stamps are inserted to the data stream before delivery to the link.

Isochronous Transmit FIFO 34 buffers isochronous transmit data that is to be transmitted to the IEEE1394 bus.

Other FIFOs 36 buffer all other data that flows from the IEEE1394 bus to the host interface, that is, all data except the isochronous transmit data.

Isochronous Transmit DMA 38 is a direct memory access engine which pulls isochronous transmit data from the host interface and pushes it into the isochronous transmit FIFO.

Other DMA Contexts 40 are direct memory access engines which push all received data from the IEEE1394 bus to the host interface for transmission and pull all data that is not associated with isochronous transmit from the host interface to transmit to the IEEE1394 bus.

Host Interface 42 interfaces with a host input/output bus or any other data path between the IEEE1394 host controller and the central processing unit of the computer system.

The CIP header enhancements for host controllers described herein can remove the factor of IEEE1394 bus time from the algorithm that generates the isochronous stream CIP headers. This invention can prevent unexpected software latencies in the operating system from providing incorrect time stamps, which can result in catastrophic performance to the end user.

This invention can remove the additional host bus bandwidth and packet creation overhead required in reading IEEE1394 bus time from the host controller before queuing packets for transmission through the operating system. The race condition that exists between the last read of IEEE1394 bus time from the host controller and the actual time (bus time can change) the packet is transmitted can be removed with the present invention.

While the principles of the present invention have been demonstrated with particular regards to the structure and methods disclosed herein, it will be recognized that various departures may be undertaken in the practice of the invention. The scope of the invention is not intended to be limited to the particular structure and methods disclosed herein, but should instead be gauged by the breadth of the claims that follow.

What is claimed is:

1. A method of calculating an offset to add to IEEE1394 bus time when automatically inserting time stamp information into isochronous packets, said method utilizing a host controller functionality to start an isochronous transmit stream at a value of IEEE1394 bus time, said offset being the difference between said transmit stream start time and a first time stamp present in the data stream.

2. In an IEEE1394 host controller, a method for inserting a time stamp into a common isochronous packet comprising the steps of:

a. setting a format identifier to a first value for transmission of Digital Video Cassette Recording data streams and to a second value for transmission of AUDIO/VIDEO streams;
   b. storing into an offset register an offset value being the difference between said transmit stream start time and a time stamp present in the data stream when a first packet is transmitted after an isochronous transmit DMA first becomes enabled for operation; and
   c. for each packet in the stream, adding the contents of the offset register to the time stamps of each packet.

* * * * *